United States Patent [19]
Alexander et al.

[11] Patent Number: 5,909,564
[45] Date of Patent: Jun. 1, 1999

[54] MULTI-PORT ETHERNET FRAME SWITCH

[75] Inventors: Thomas Alexander, Mulino; Bradley H. Smith, Beaverton; Calvin S. Taylor, Tigard, all of Oreg.

[73] Assignee: PMC-Sierra Ltd., British Columbia, Canada

[21] Appl. No.: 08/828,038

[22] Filed: Mar. 27, 1997

[51] Int. Cl.⁶ .................................................. G06F 15/163
[52] U.S. Cl. ...................................... 395/311; 395/200.42
[58] Field of Search .................................... 395/309, 311, 395/200.42, 200.43

[56] References Cited

U.S. PATENT DOCUMENTS

| | | | |
|---|---|---|---|
| 5,633,865 | 5/1997 | Short | 370/412 |
| 5,740,171 | 4/1998 | Mazzola | 370/392 |

*Primary Examiner*—Glenn A. Auve
*Attorney, Agent, or Firm*—Hall, Priddy & Myers

[57] ABSTRACT

An Ethernet switch which includes a plurality of medium access control (MAC) interface logic circuits each coupled to an associated output port operative to perform serial-to-parallel conversion for frames being received from an associated output port and parallel-to-serial conversion for frames being transferred to an associated output port and other interfacing functions. The switch has an internal bus, a buffer memory coupled to each of the MAC interface logic circuits at one end and to the internal bus at another end, a switch central processor coupled to the internal bus and a multi-channel Direct Memory Access (DMA) Controller coupled to the internal bus and to the switch central processor, operative to transfer incoming frames to an external memory and to transfer frames stored temporarily in external memory to their destination in accordance with instructions from the switch central processor. An external memory controller is coupled to the DMA Controller and to an external memory port. An expansion bus interface logic circuit is coupled to said DMA Controller and to an expansion bus port. The switch central processor performs frame address handling and controls transfer of incoming frames to their destination.

23 Claims, 9 Drawing Sheets

MULTI-PORT ETHERNET FRAME SWITCH

FIELD

The present invention relates to a multi-port Ethernet frame switch using hardware and software combined.

BACKGROUND

Ethernet networks can be split and isolated into multiple "segments" with frames between segments selectively forwarded as required to maintain communication between devices on different segments. The device responsible for forwarding the frames between segments is known as an Ethernet switch. Traditionally such switches were implemented using only hardware with all forwarding decisions and processing being made using hard-wired logic to obtain the necessary level of performance. This has been an expensive and inflexible method of realizing a frame switching device. In addition, the frame switching algorithms employed had to be quite simple and unsophisticated due to the need to implement them in hardware. Finally, it was necessary to make use of a separate CPU (in addition to the frame switching hardware) in order to initialize, manage and maintain the switch, and allow human system managers to communicate with it, which also increased the cost and development time of Ethernet frame switches.

Accordingly, it is an object of the invention to provide an improved Ethernet frame switch. It is a further object of the invention to provide a an Ethernet frame switch of reduced cost and complexity. It is yet a further object of the invention to provide an Ethernet frame switch that allows modification of the switching processes without replacement of the hardware.

SUMMARY OF THE INVENTION

According to the invention there is provided an network switch which includes a plurality of medium access control (MAC) interface logic circuits each coupled to an associated output port operative to perform serial-to-parallel conversion for frames being received from an associated output port and parallel-to-serial conversion for frames being transferred to an associated output port and other interfacing functions. Clock synchronization, preamble generation, stripping and data buffering required to convert between bit-serial data streams exchanged with external transceivers and parallel data streams employed internally by said network switch are also performed. The switch has an internal bus, a switch central processor coupled to the internal bus and a multi-channel Direct Memory Access (DMA) Controller coupled to the internal bus and to the switch central processor, operative to transfer incoming frames to an external memory and to transfer outgoing frames stored temporarily in external memory to their destination one at a time in accordance with instructions from the switch central processor. An memory controller is coupled to the DMA Controller and to an external memory port operative to interface between said DMA controller and the external memory. The switch central processor has queuing firmware operative to set up transmit and receive queuing functions for frame transfer to and from the frame memory and storage in the frame memory.

Preferably, each of the Ethernet MAC interface logic circuits may have hardware for implementing serializer/deserializer conversion, transmit and receive byte counters, and transmit and receive state machines.

The Ethernet MAC interface logic circuits many also have control logic circuits for controlling reception and transmission of data bytes and detecting collisions and buffering and synchronizing FIFO's and switch central processor has firmware operative to perform frame error classification and frame-level MAC protocol functions.

A receive byte counter may be operative to count the number of 8-bit bytes in a received frame. The switch central processor may have firmware for reading the contents of the receive byte counter, for classifying frame lengths, accessing and updating counters stored in memory and performing remote monitoring statistics counter updates.

The expansion bus interface may contain a combination of distributed communication logic and firmware that enables switch central processors of interconnected ones of said network switches to inter-communicate.

The Ethernet switch processor may accept as input the total length of a frame in bytes, and generates as output a numeric index of the range of sizes into which the frame falls.

Hardware may be used to perform bit-by-bit frame handling and firmware may be used to implement frame-by-frame processing.

Advantageously, the Ethernet switch processor in response to firmware routines, inspects a frame when either received or transmitted, classifies a frame as normal or errored and, if errored, the type of error present, and then locates and increments required counters by an amount determined by the frame length counter.

BRIEF DESCRIPTION OF THE DRAWINGS

Further features and advantages will be apparent from the following detailed description, given by way of example, of a preferred embodiment taken in conjunction with the accompanying drawings, wherein.

DETAILED DESCRIPTION WITH REFERENCE TO THE DRAWINGS

Figure 1:
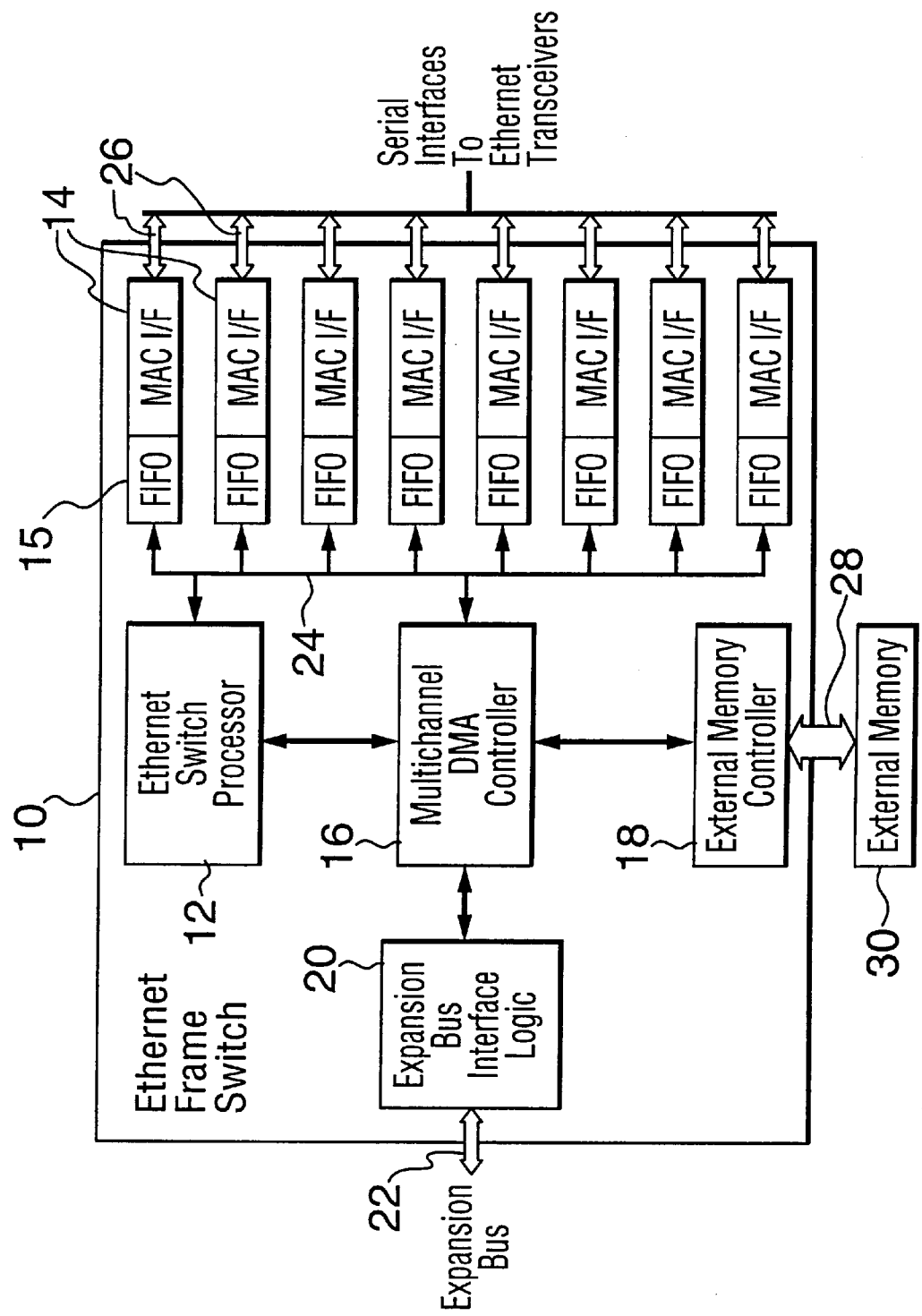
FIG. 1 is a schematic block diagram of the Ethernet frame switch.

Referring to FIG. 1, the Ethernet frame switch 10 has an Ethernet switch processor 12 coupled to a multichannel direct memory access (DMA) Controller 16, medium access control (MAC) interface logic blocks 14, an external memory controller 18, and an expansion bus interface logic block 20. The MAC interface logic blocks or ports 14 link a number of end-systems or terminals connected to the frame switch 10 by bit serial interfaces (not shown). There may be multiple end-systems or terminals coupled to each MAC interface port 14.

Ethernet frame data is accepted from the terminals or end-systems (not shown) by the MAC interface logic blocks 14 and is buffered in the associated FIFO's. The buffered data is transferred to external memory (not shown) by the DMA Controller 26. The DMA Controller 16 notifies the Ethernet switch processor 12 of the presence of a received frame. The Ethernet switch processor 12 then inspects the frame to determine the source and destination addresses encoded within the frame and uses these addresses to determine the target or destination of the frame as well as to discover the addresses of the end-systems that are associated with each MAC interface port 14. If the target of the frame is determined to be an end-system associated with some other MAC interface port 14, then the Ethernet switch processor 12 causes the DMA controller 16 to transfer the frame data out of external memory (not shown) to the MAC interface port 14. The MAC interface port subsequently transfers the information to the end-system by the standard Ethernet transmission process.

Figure 2:
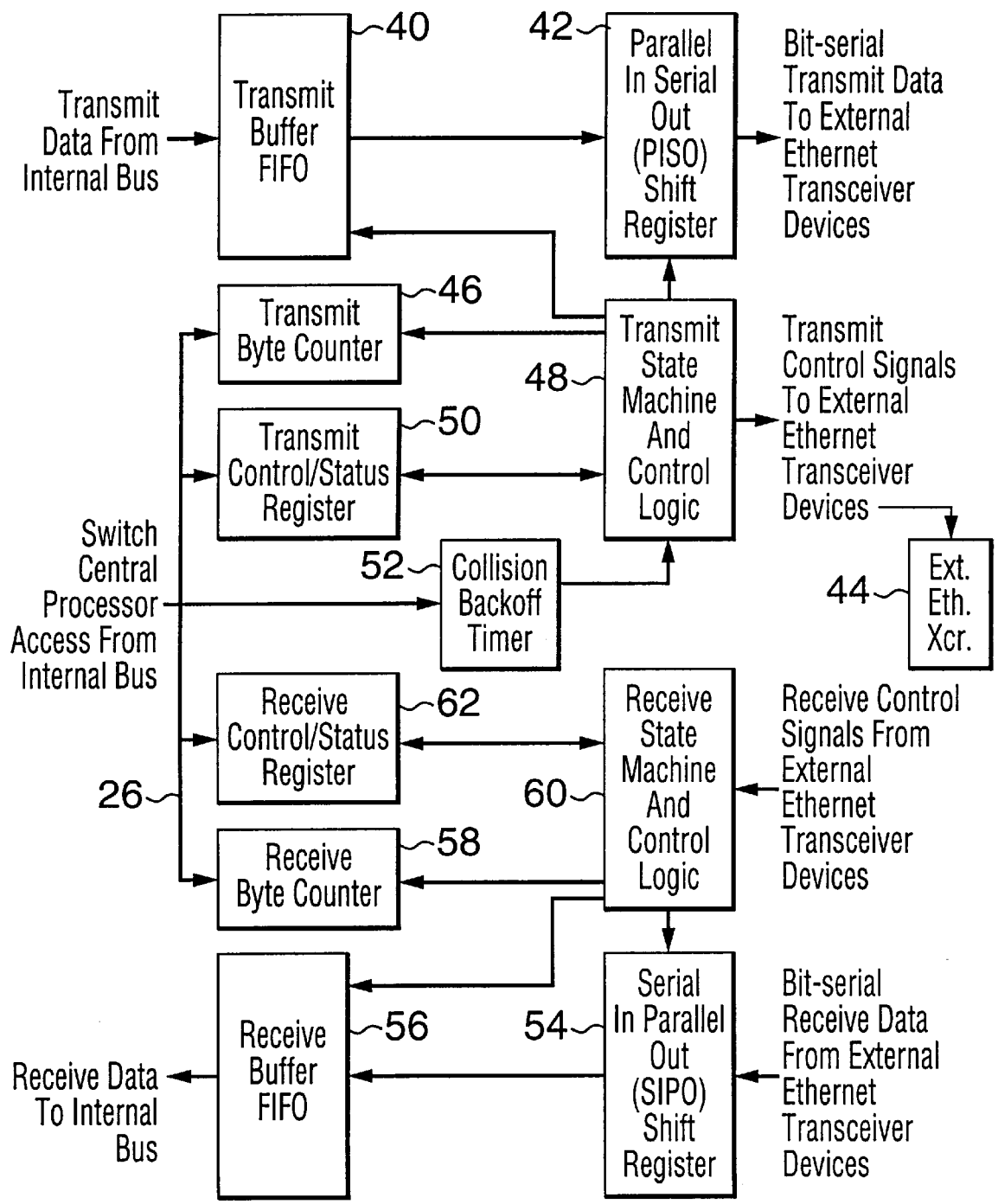
FIG. 2 is a schematic diagram of the frame transmit and receive elements.

The MAC interface ports 14 perform the required interfacing to external Ethernet transceiver devices 44 as seen in FIG. 2 that implement standard medium access control functions required by the Ethernet/IEEE 802.3 standard. The transceiver devices 44 connect to the Ethernet frame switch device 10 by means of bit-serial interfaces operating at the Ethernet line frequency of 10 MHz. Transmit Ethernet frames are buffered in the External Memory 30 and transmitted to an external Ethernet transceiver device 44 (for subsequent transmission on the Ethernet physical medium) under control of the switch central processor 12. FIG. 2 shows the MAC interface hardware circuit which consists of frame transmit elements and receive elements. the frame transmit elements comprise a Transmit Buffer FIFO 40, a Parallel-In-Serial-Out (PISO Shift Register 42, a Transmit Byte Counter 46, a Transmit State Machine and Control Logic 48, a Transmit Control/Status Register, and a Collision Backoff Counter 52. The frame receive elements comprise a Receive Buffer FIFO 56, a Serial-In-Parallel-Out (SIPO Shift Register 54, a Receive Byte Counter 58, a Receive State Machine and Control Logic 60, and a Receive Control/Status Register.

The operation of the frame transmit elements is as follows:

(a) The transmit buffer FIFO 460 accepts Ethernet frame data transferred from the external memory 30 by the DMA Controller 16 and buffers it prior to transmission. In addition, the Transmit Buffer FIFO 40 implements the clock synchronization function required to transfer data between the DMA Controller clock domain and the Ethernet transceiver clock domain.

(b) The data stored in the Transmit Buffer FIFO 40 is output to the PISO Shift Register 42 which accepts parallel 32-bit data words from the Transmit Buffer FIFO 40 and converts them to a 1-bit serial data stream that is output to the external Ethernet transceiver device 44. The PISO Shift Register 42 also generates the appropriate frame header information required for proper Ethernet frame transmission.

(c) The Transmit Byte Counter 46 counts the number of 8-bit bytes that have been transferred from the Transmit Buffer FIFO 40 to the PISO Shift Register 42 during the transmission of a single frame. It is cleared to zero at the start of frame transmission, and increments by one for every byte transmitted. The contents of the Transmit Byte Counter 46 are accessible by the Switch Central Processor 12 at the conclusion of the transmission of each Ethernet frame.

(d) The Transmit State Machine and Control Logic 48 controls and sequences the overall operation of the frame transmit elements. It directs the Transmit Buffer FIFO 40 to pass frame data to the PISO Shift Register 42, and also directs the Shift Register 42 to serialize and transfer the information to the external transceiver device 44. The Transmit State Machine 48 also implements the bit-counting operations required for proper frame timing and inter-frame gap timing.

(e) The Transmit Control/Status Register 50 is updated by the Switch Central Processor 12 to signal transmit commands to the Transmit State Machine and Control Logic 48 and is also updated by the Transmit State Machine and Control Logic 48 to signal transmit status information to the Switch Central Processor 12. The Switch Central Processor 12 can access the Transmit Control/Status Register 50 via the internal bus 24.

(f) The Collision Backoff Timer 52 is loaded by the Switch Central Processor 12 to force the Transmit State Machine and Control Logic 48 to cease transmitting Ethernet frames for a specified time, referred to as the Backoff Time, after a collision (i.e., simultaneous transmission and reception) is detected. The Switch Central Processor 12 is responsible for computing the appropriate Backoff Time value and loading the Collision Backoff Timer 52 after every collision during a frame transmission attempt.

Frame receive elements implement the bit-by-bit operations needed to receive an Ethernet frame that has been accepted from the Ethernet physical medium by the external Ethernet transceiver device 44. The operation of these elements is as follows:

(a) The serial frame data presented to the Ethernet switch device 10 by the external Ethernet transceiver device 44 is accepted by the SIPO Shift Register 54, converted from 1-bit serial information to 32-bit parallel data words, and then passed to the Receive Buffer FIFO 56.

(b) The Receive Buffer FIFO 56 accepts and stores the data words from the SIPO Shift Register 54. The data words are stored until the DMA Controller 16 can read them out via the internal bus 24, and store them to frame buffers in external memory 30 In addition to implementing a buffering function, the Receive Buffer FIFO 52 also serves to transfer data across the boundary between the Ethernet transceiver clock domain and the clock domain of the DMA Controller 16.

(c) The Receive Byte Counter 58 counts the total number of 8-bit data bytes that have been transferred from the SIPO Shift Register 54 to the Receive Buffer FIFO 56 for a particular frame. It is cleared to zero at the start of reception of any frame, and incremented by one for every byte transferred.

(d) The Receive State Machine and Control Logic 60 controls and sequences the operation of the SIPO Shift Register 54 and the Receive Buffer FIFO 56. It is also responsible for detecting Ethernet frame boundaries within the received data stream, delineating the frame payload information, and timing the process of receiving frame data as well as the gap between receive frames. In addition, it is responsible for performing the checks on the integrity of the received frame, as specified by the Ethernet/IEEE 802.3 standard.

(e) The Receive Control/Status Register 62 is written to by the Switch Central Processor 12 to control the operation of the Receive State Machine and Control Logic 60 to report status information to the Switch Central Processor 12.

The operation of the firmware for implementing frame-by-frame processing is as follows. When the frame receive elements described above detect that a compete Ethernet frame has been received, notification is sent to the Switch Central Processor 12 by the Receive State Machine and Control Logic 60. The Switch Central Processor 12 then interrupts its current task and reads the frame status information from the Receive Control/Status Register 62. This frame status information is processed to determine whether the received frame is a normal or errored frame, and, if errored, also to determine the type of error present within the Ethernet frame. In addition, the Switch Central Processor 12 reads the contents of the Receive Byte Counter 58 to determine the length of the Ethernet frame. After the frame has been classified as normal or errored, the Switch Central Processor 12 then performs the frame statistics counting operation required by the Ethernet/IEEE 802.3 standard, and subsequently performs the frame processing and switching operations required to forward the frame to its final destination.

When a frame is to be forwarded (transmitted) out a given MAC interface port 26, the Switch Central Processor 12 sets up the DMA controller 16 to transfer the buffered frame data from the external memory 30 to the Transmit Buffer FIFO 46, and also sets up the frame transmit elements described above to begin transmitting the frame. The latter setup is done via the Transmit Control/Status Register 50. Upon receipt of this notification by the Switch Central Processor 12, and after detecting data transferred to the Transmit Buffer FIFO 40 by the DMA Controller 16, the Transmit State Machine and Control Logic 48 signals the PISO Shift Register 42 to transmit the frame header, and then to read data words from the Transmit Buffer FIFO 40, serialize them, and pass them to the external Ethernet transceiver device 44 for transmission on the physical medium. The Transmit Byte Counter 46 is updated with the count of bytes so transmitted. At the termination of frame transmission, the Switch Central Processor 12 is alerted, causing it to read out the frame transmission status from the Transmit Control/Status Register 50 as well as the count of the total number of bytes transmitted for the frame from the Transmit Byte Counter 46. The Switch Central Processor 12 subsequently processes this information, updates the frame transmit statistics required by the Ethernet/IEEE 802.3 standard, and then begins transmission of the next frame, if any.

It is possible for a collision (simultaneous transmission and reception, resulting in lost or corrupted data) to occur during frame transmission. In this case, the collision status is reported to the Switch Central Processor 12 via the Transmit Control/Status Register 50. The Switch Central Processor 12 is then responsible for loading the Collision Backoff Timer 52 with a suitably computed Backoff Time, in order to force the Transmit State Machine and Control Logic 48 to cease transmitting for a specified period of time, and also to set up the frame transmit elements to retransmit the same frame at the conclusion of the Backoff Time (if required). The Switch Central Processor 12 is also responsible for imposing the bound on the number of frame transmission attempts that is required by the Ethernet/IEEE 802.3 standard.

All of the operations performed by the Switch Central Processor 12 are implemented by means of firmware instructions that are executed by the Switch Central Processor 12.

The Ethernet switch 10 contains hardware and firmware for implementing statistics counters required for remote monitoring, as described below.

Figure 3:
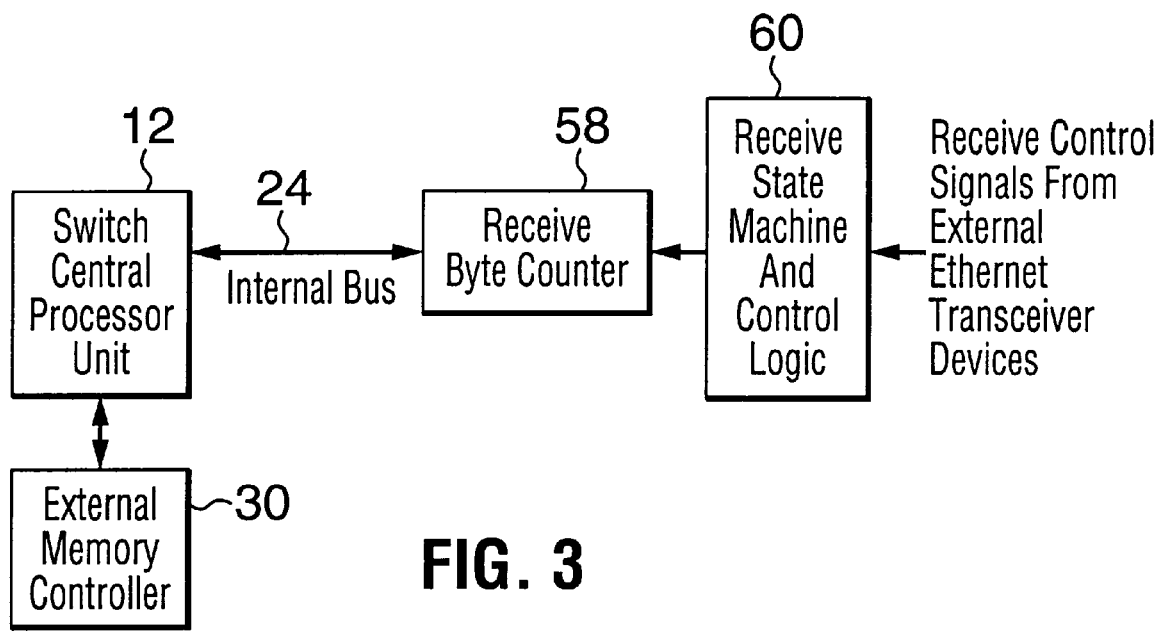
FIG. 3 is a schematic block diagram of the hardware for the statistics counter update mechanism.
Figure 4:
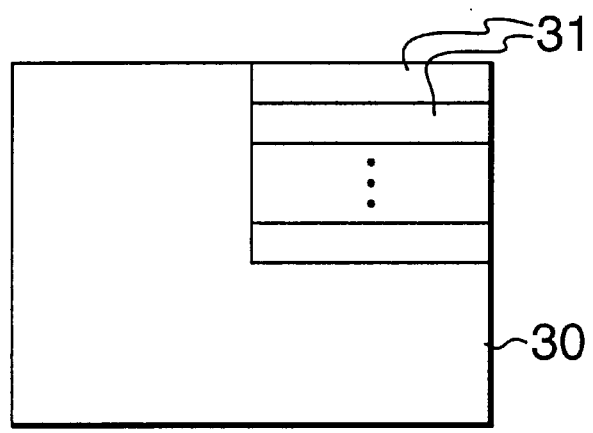
FIG. 4 is a schematic diagram showing the counters stored in external memory.

Referring to FIGS. 3 and 4, the statistics counter update mechanism consists of the Receive Byte Counter 58 (which is controlled and incremented by the Receive State Machine and Control Logic 60) coupled with firmware running on the Switch Central Processor 12, which accesses and updates counters stored in the external memory 30 via the External Memory Controller 18.

When an Ethernet frame is received, the Receive Byte Counter 58 is suitably manipulated by the Receive State Machine and Control Logic 60 to count the number of 8-bit bytes present in frame. At the termination of frame reception, the Switch Central Processor 12 reads out the contents of the Receive Byte Counter 58 and performs the necessary remote monitoring statistics counter updates by means of firmware (i.e., by executing instructions as part of its program code) as described below.

The firmware running on the Switch Central Processor 12 is responsible for the following tasks while performing the remote monitoring functions:

(a) It determines the total size of the frame (by reading the Receive Byte Counter 58) and the error status for the frame (by reading the Receive Control/Status Register 62).

(b) It locates a particular set of remote monitoring counters 31 associated with the given MAC interface logic 14 (i.e., physical port) from which the Ethernet frame was received. Each MAC interface logic block 14 possesses a separate set of such counters, located in the external memory 30.

(c) It inspects the frame size and error status, classifies the frame size into the size ranges required by the remote monitoring (RMON) 31 standard, and then determines the index of the counters to be updated.

(d) If finally accesses the current contents of the remote monitoring counters 31 increments the contents by the required amount, and then writes the new values of the counters 31 back to the external memory 30.

(The firmware described here is only responsible for updating the counter values stored in external memory 30 upon the receipt of each Ethernet frame. Additional firmware that also runs on the Switch Central Processor 12 is invoked when necessary to read out the most current values of these counters 31 in response to requests from management stations located elsewhere in the network environment.)

Figure 5:
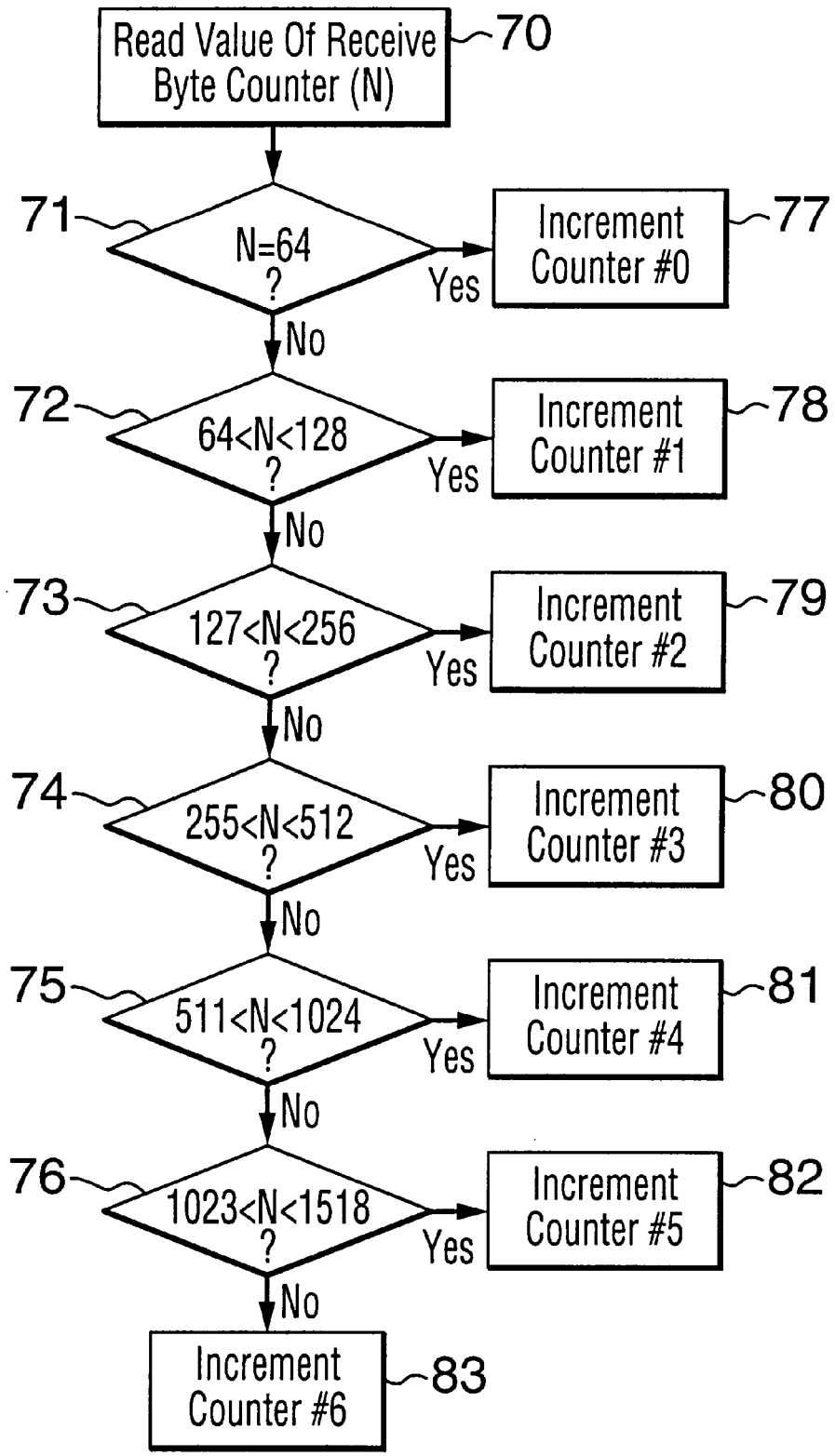
FIG. 5 is a decision tree for frame length classification procedure.

FIG. 5 shows the decision tree followed by the frame length classification procedure. In essence, the procedure takes as input at step 70 the total length of the frame in bytes (denoted by N in the figure) tests the value of N at steps 71, 72, 73, 74, 75 and 76 and classifies the frame length as falling into a particular range of lengths. Once the range of lengths has been determined, the firmware then retrieves and increments the counter associated with that range at one of steps 77, 78, 79, 80, 81, 82 and 83. (In this manner, the number of frames of various lengths that have been received by the Ethernet switch 10 upon the given physical port 26 may be determined at any time.) It should be noted that the index of the counter is generated with reference to the set of monitoring counters 31 that are associated with that particular physical port 26; a separate set of monitoring counters 31 is associated with each physical port 26.

Figure 6:
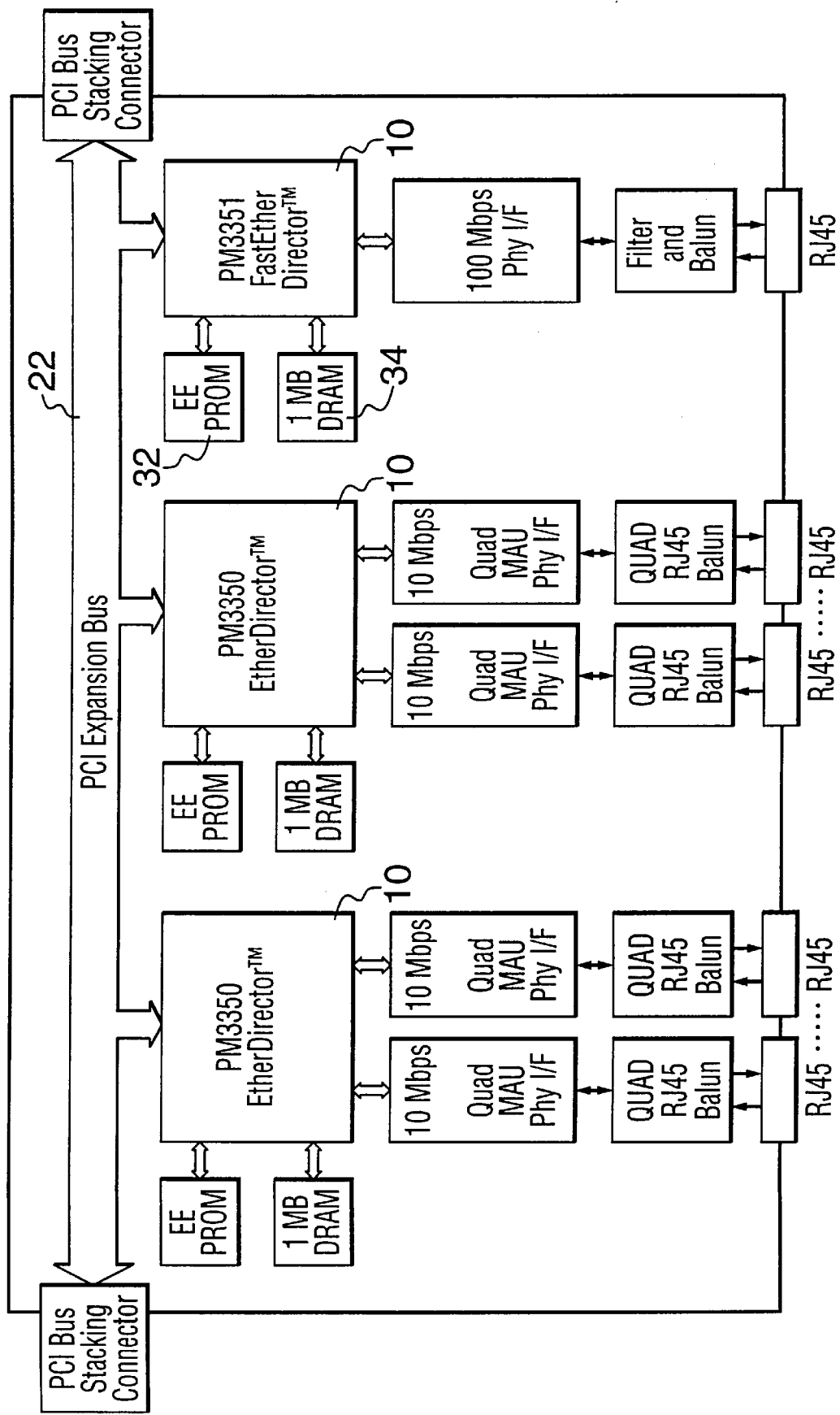
FIG. 6 is a schematic block diagram of three Ethernet frame switches connected together via the PCI Expansion Bus to make a larger switch.

Referring to FIGS. 1 and 6, the Ethernet switch device 10 contains communication logic within its Expansion Bus Interface Unit 20 that permits the Switch Central Processors 12 of different Ethernet switch devices 10 interconnected via the Expansion Bus 22 to inter-communicate and exchange Ethernet frame data that must pass between Ethernet switch devices 10.

Figure 7:
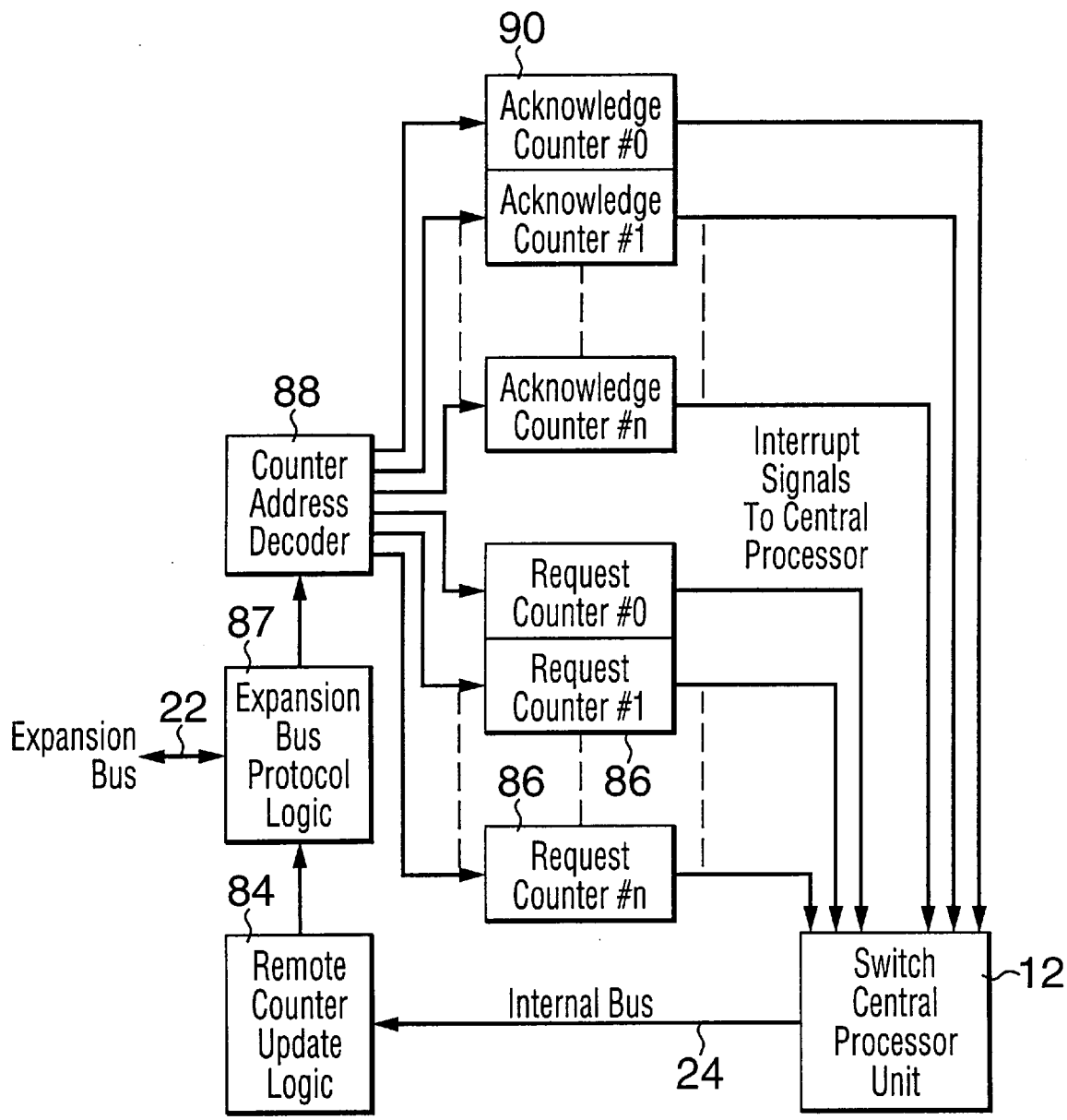
FIG. 7 is a schematic diagram of the communication logic circuitry.

FIG. 7 shows a block diagram of the communication logic. It consists of the Expansion Bus Protocol Logic 87, which serves to interface to and maintain the protocol of the Expansion Bus 22; a Remote Counter Update Logic block 84 that is controlled by the Switch Central Processor 12 (via the Internal Bus 24) to cause communication requests and acknowledges to be sent to other Ethernet switch devices via the Expansion Bus 22; a set of Request Counters 86, which are used to accumulate communication acknowledgments directed to this Ethernet switch device 10 from other Ethernet switch devices; and a Counter Address Decoder 88, which accepts communication requests and acknowledges (directed to this Ethernet switch device 10 from other devices) from the Expansion Bus Protocol Logic 87 and, after decoding them, causes the appropriate Request or Acknowledge Counter 90 to be incremented. The Request 86 and Acknowledge Counters 90 generate interrupt notification signals to the Switch Central Processor 12 to indicate that one or more requests or acknowledges have been received. The Switch Central Processor 12 is responsible for decrementing the appropriate counter after receiving these interrupts.

The operation of the communication logic is as follows.

1. The Switch Central Processor 12 determines by means of firmware code that an Ethernet frame is to be transferred to another Ethernet switch device that is connected to the Expansion Bus 22. It also computes a numeric index associated with the particular target Ethernet switch device (referred to as the "destination device"), as well as the numeric index associated with the Ethernet switch device 10 of which it is a part (referred to as the "source device").

2. The Switch Central Processor 12 then accesses the Remote Counter Update Logic 84 via the Internal Bus 24 and commands it to issue a communication request transaction directed at the destination Ethernet switch device 10 via the Expansion Bus Protocol Logic 87.

3. The Remote Counter Update Logic 84 then causes the Expansion Bus Protocol Logic 87 to perform a standard data write transaction on the Expansion Bus 22. This data write transaction is directed at the Request Counter 86 with a numeric index corresponding to the source device that is located within the destination device. For example, if the numeric index of the source device is 3 decimal and that of the destination device is 5 decimal, then Request Counter #3 within destination device #5 would be written to.

4. The Expansion Bus Protocol Logic 87 within the destination device receives the write transaction and notifies the Counter Address Decoder 88. The Counter Address Decoder 88 then ignores the data associated with the write transaction, but determines the numeric index of the counter to be incremented from the address of the write transaction and then causes the particular counter to be incremented (in this case, the Request Counter 86 associated with the source device).

5. When the Request Counter 86 is incremented, and found to be non-zero, an interrupt is generated to the Switch Central Processor 12. This interrupt causes the Switch Central Processor 12 to invoke firmware code that determines how the interrupt is to be processed. In this case, the firmware code determines that an Ethernet frame is available for transfer across the Expansion bus from the source device whose numeric index corresponds to that of the Request Counter 86 generating the interrupt. It then causes the Ethernet frame to be transferred by means of the DMA Controller 16.

6. When the action(s) associated with the Request Counter 86 interrupt have been completely performed, the Switch Central Processor 12 on the destination device causes the Request Counter 12 to be decremented, removing the interrupt. The Switch Central Processor 12 in the destination device then accesses the Remote Counter Update Logic 84 in the destination device via the Internal Bus and commands it to issue a communication request transaction directed at the source Ethernet switch device 10 via the Expansion Bus Protocol Logic 87.

7. The Remote Counter Update Logic 84 causes the Expansion Bus Protocol Logic 87 to perform a standard data write transaction on the Expansion Bus 22, as before. This data write transaction is directed at the Acknowledge Counter 90 with a numeric index corresponding to the destination device that is located within the source device. In the aforementioned example (where the index of the source device is 3 and the destination device is 5), then Acknowledge Counter #5 within device #3 would be written to.

8. The Expansion Bus Protocol logic 87 within the source device receives the write transaction and notifies the Counter address Decoder 88. The Counter Address Decoder 88 determines the numeric Index of the counter to be incremented from the address of the write transaction and then causes the particular counter to be incremented (in this case, the Acknowledge counter 90 associated with the destination device).

9. When the Acknowledge Counter 90 is incremented, and found to be non-zero, an interrupt is generated to the Switch Central Processor 12 to invoke firmware code that processes the acknowledgement of the receipt of the Ethernet frame by the destination device and suitably updates internal data structures. The Switch Central Processor 12 firmware then decrements the Acknowledge Counter 90 in question, thereby removing the interrupt. The request/acknowledge communication procedure is complete at this point.

The use of counter logic for implementing the notification of requests and acknowledgements between Ethernet switch devices permits multiple requests and acknowledgements to be issued by multiple devices without regard to the number of such requests and acknowledgements that may have been already issued but not yet processed.

Figure 8:
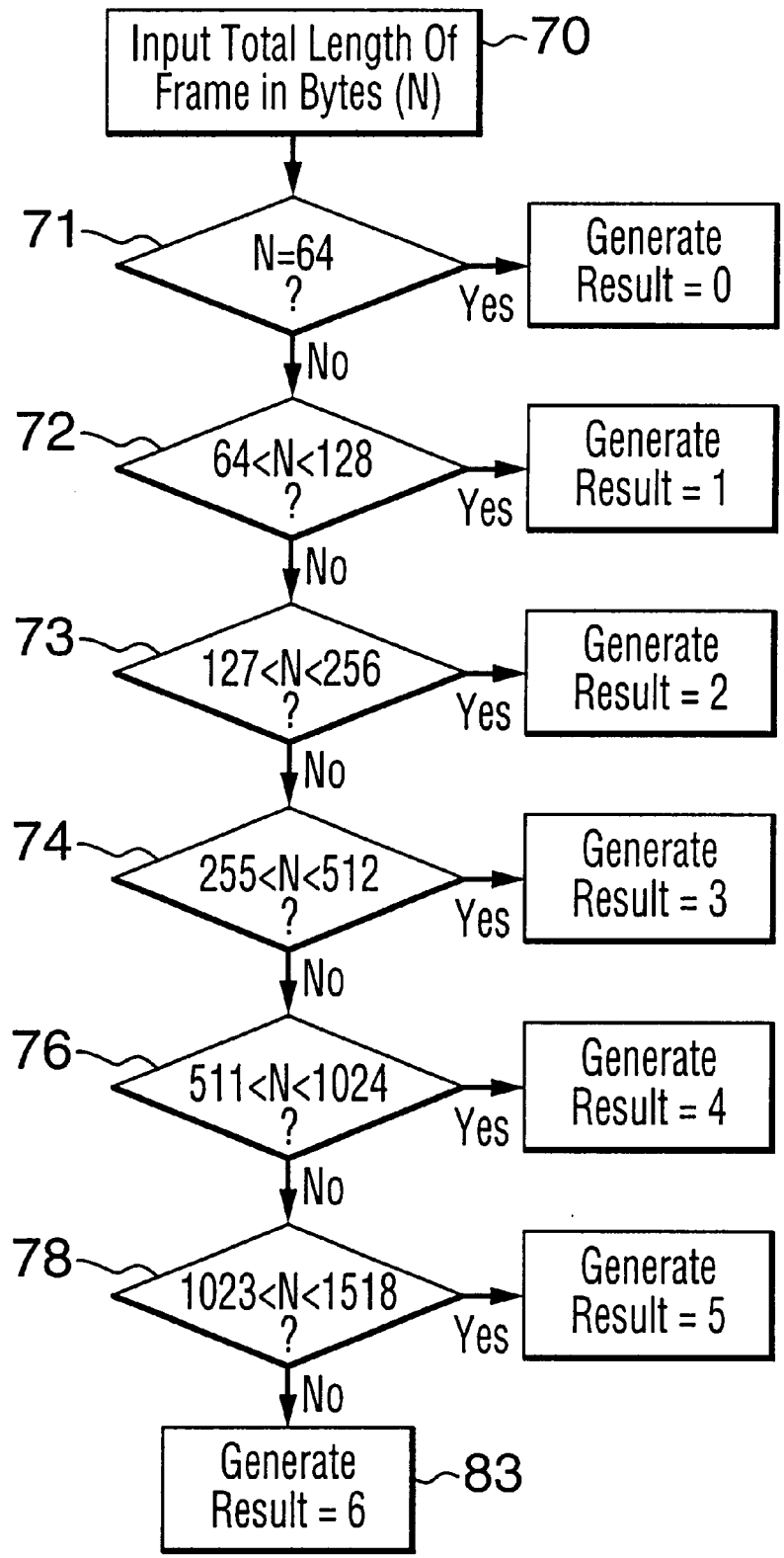
FIG. 8 is a 6-stage decision tree for instruction acceleration hardware.

Referring to FIG. 8, the outputs for the six-stage decision tree associated with the instruction acceleration hardware are as follows. In stage 1, the frame length is compared with 64 decimal; if it is less than or equal to 64, then a value of zero is output as the result. In stage 2, the frame length is compared with 128 decimal; if it is greater than 64 but less than 128, then a value of 1 is output as the result. This process is continued for the numbers 256, 512, 1024 and 1518, outputting different results based on the numeric range matched.

Note that the entire decision tree is implemented as a single block of combinatorial logic, and hence the entire decision process is completed in a single clock cycle within the Switch Central Processor 12. Also note that it is not necessary to perform the comparison of the frame length to both the upper and the lower bound at each stage of the decision tree; as the decisions are made in priority order (i.e., stage 1 of the decision tree is performed before stage 2, and so on), it is only necessary to perform the comparison of the frame length to the upper bound, as the lower bound comparison will have already been made.

Figure 9:
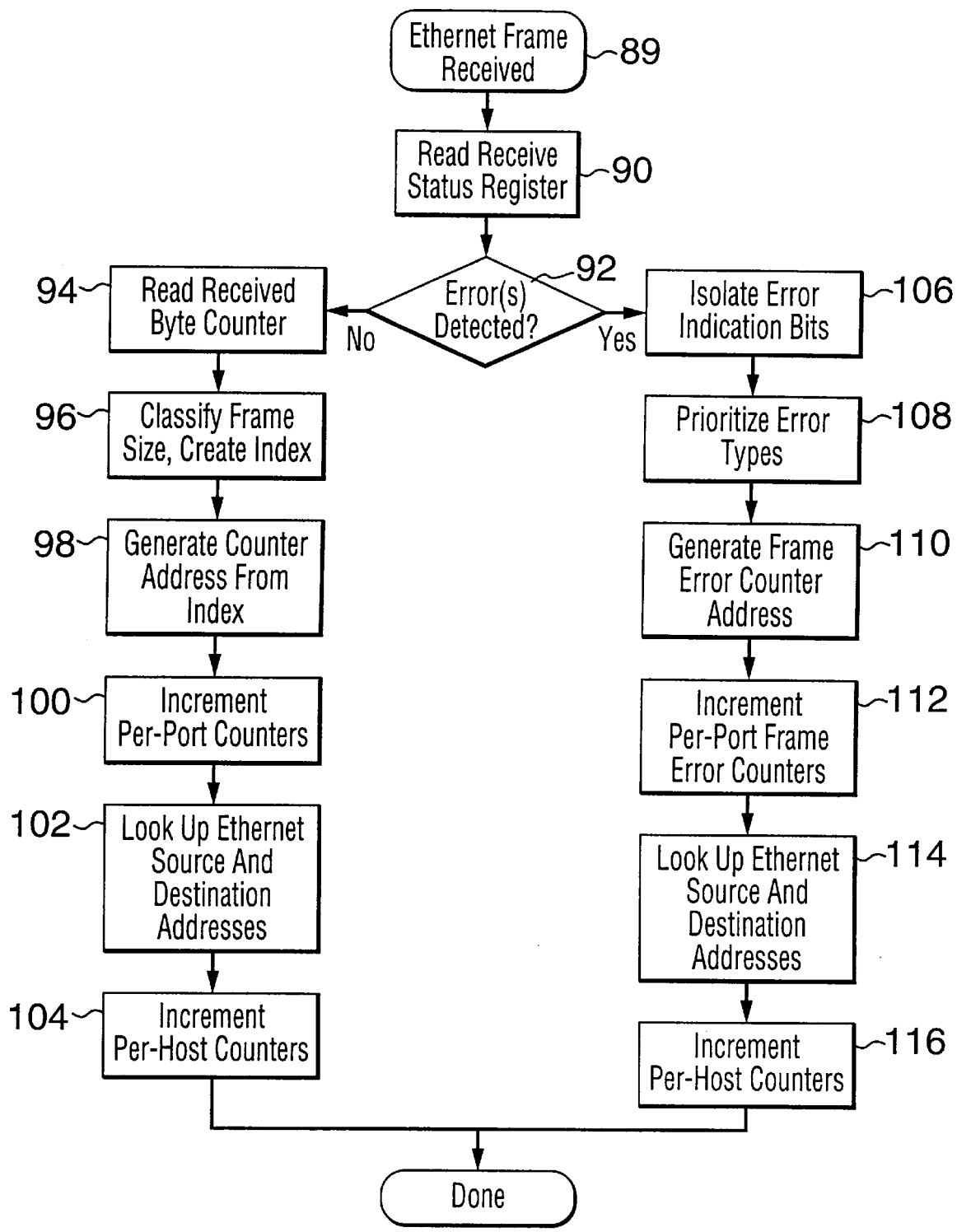
FIG. 9 is a firmware algorithm used to process received frames after they have been received and buffered in external memory.
Figure 10:
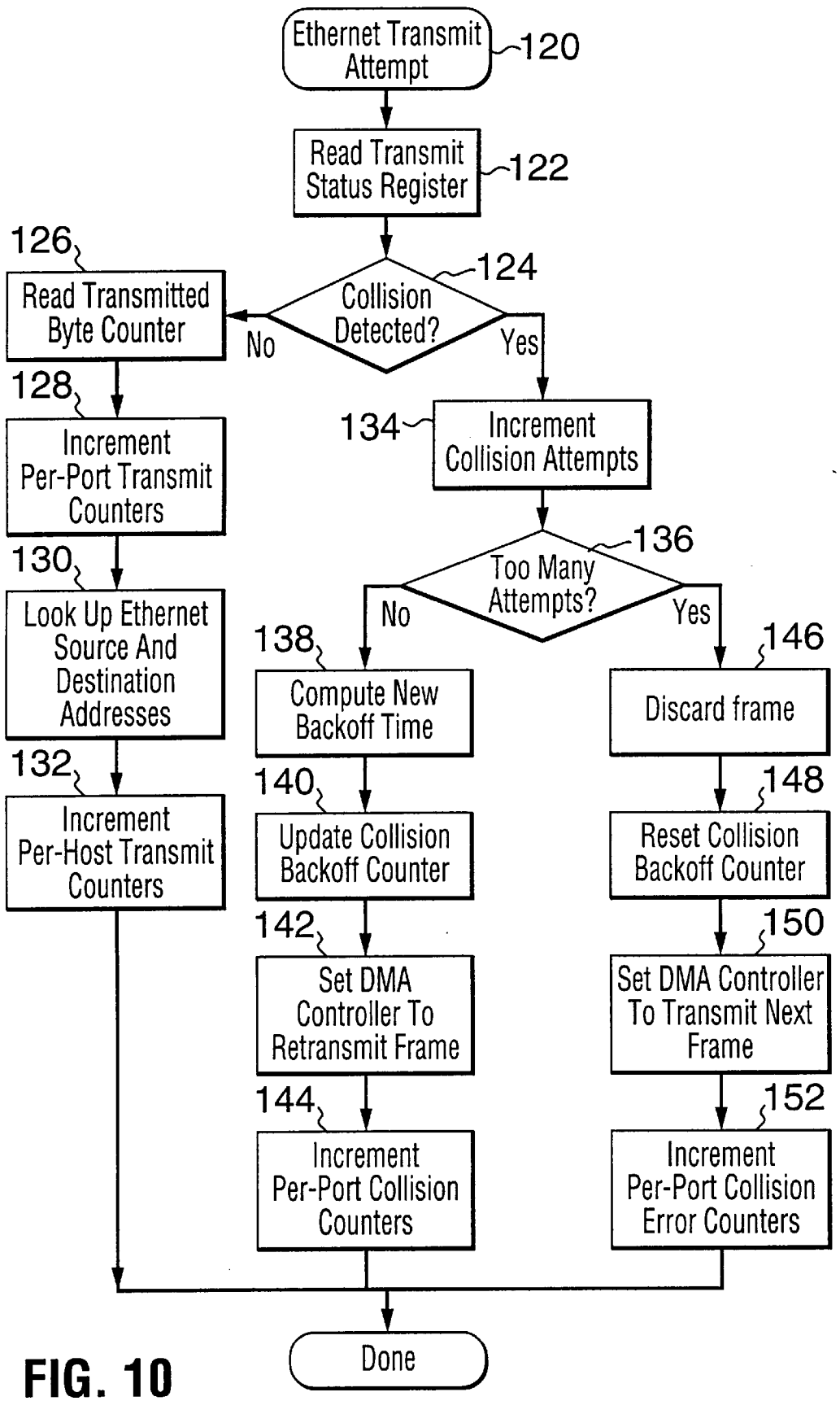
FIG. 10 is a firmware algorithm used to process transmitted Ethernet frames after frame transmission has been completed.

FIG. 9 describes the firmware algorithm used to process received frames after they have been fully received and buffered in the external memory 30 (i.e., all receive frame data has been completely transferred from the Receive Buffer FIFO 56 to the external memory by the DMA Controller 16). The firmware procedure is invoked upon the completion of the reception of a given frame. It first determines at step 90 whether the frame is errored or normal, by reading and inspecting the status bits presented by the MAC interface circuit hardware in the Receive Control/Status Register 62. It then takes different processing paths depending on whether or not an error was detected at step 92.

If the frame was normal (i.e., no error was detected), then the firmware at step 94 reads the Receive Byte Counter 58 from the hardware and performs the required range classification on the value so read at step 96 and determines the index of the statistics counter to update. At stop 98 it then increments the appropriate per port statistics counters to reflect the newly received frame. Subsequently, at stop 100 it extracts the source and destination addresses from the Ethernet frame and performs and address resolution operation and at step 102 locates the statistics blocks associated with the addresses. This operation is also performed in the course of determining the ultimate destination of the frame, but this is outside the scope of this claim. Once the statistics blocks associated with these addresses have been located, at step 104 the firmware updates the counters held within these blocks to reflect the fact that a frame was received from the given source address and directed to (transmitted to) the given destination address. (The various counters are actually predetermined 32-bit regions located in the external memory 30). The firmware is done with classifying the frame and processing the statistics at this point.

If the frame was errored, then at step 106 the error indication bits are extracted from the contents of the Receive Control/Status Register 62 and at step 108 a suitable priority encode is performed upon the error indication bits according to the ordering defined in the Ethernet/IEEE 802.3 standard. (Note that the error indication bits correspond to the basic error primitives defined by the Ethernet/IEEE 802.3 standard, and hence are not described here.) The result of the priority encoding at step 108 is used at step 110 Generate Frame Error Counter address and then at step 112 to select and increment a particular counter from the set of counters associated with the given receive port. Subsequently, at step 114 the addresses within the Ethernet frame are read out and used to locate the statistics blocks associated with the source and destination addresses, and at step 116 the error counters within these statistics blocks are also incremented appropriately. The firmware is deemed to have completed processing the errored frame at this point.

The firmware for Ethernet frame transmittal shown in FIG. 9 proceeds from step 120 by first reading the Transmit Control Status Register 50 at step 222. If it is determined at step 124 that there has been a simultaneous transmit and receive and consequent lost or corrupted data then at step 134 a collision counter is incremented and the number of collisions recorded in the counter tested at step 136. If the number of collisions is determined to exceed a pre-established threshold then at step 146 the frame is discarded and at step 148 the Collision Backoff Counter 52 is reset. In step 150 the DMA Controller 16 is set to transmit the next frame and at step 152 the per port Collision Error Counters are incremented.

If the number of collisions is still below the threshold, a new backoff time is computed at step 138 and at step 140 the Collision Backoff Counter is updated. At step 142 the DMA Controller is set to retransmit the frame. At step 144 the per-port Collision Counters are incremented to complete the transmission.

If no collision is detected at step 124, at step 126 the Transmit Byte Counter 46 is read and at step 128 the per port Transmit Counters are incremented for the particular port 26 associated with the transmission. At step 130-the Ethernet source and destination addresses are looked up and at step 132 per host transmit counters are incremented.

The MAC interface blocks 14 implement the necessary serial-to-parallel and parallel-to-serial conversion, clock synchronization, preamble generation and stripping and data buffering required to convert between the bit-serial data streams exchanged with the Ethernet transceivers and the 32-bit parallel data streams manipulated by the Ethernet frame switch 10. In addition, the MAC interface blocks 14 implement State Machines (not shown) that perform Ethernet frame generation, delineation and separation functions with the aid of simple bit counters (not shown) to establish frame boundaries. The MAC interfaces 14 communicate with the remainder of the device by means of First-In-First-Out (FIFO) buffers 15.

The multi-channel DMA Controller 16 serves to transfer frame payload data from the various MAC interface FIFO buffers 16 to the External Memory (not shown) when the switch 10 is performing a frame receive function. The DMA Controller 16 also serves to transfer payload data from the External Memory to the FIFO buffers 15 while performing a frame transmit function. The DMA Controller 16 also performs frame transfers between the External Memory and the Expansion Bus Interface logic circuit 20. The DMA Controller 16 is set up by the Ethernet Switch Processor 12 to perform these transfers when required. Frame data are stored in external memory in predefined blocks referred to as frame buffers. The locations and the boundaries of the frame buffers are defined by the Ethernet switch processor 12.

Referring to FIG. 2, a plurality of Ethernet switches may be may be coupled together to form larger switches with up to 64 ports through the Expansion Bus 22. The expansion bus interface 20 allows frames to be transferred (with the aid of the DMA Controller 16) between the External Memory and another Ethernet Frame Switch 10 interfaced to the Expansion Bus 22. The expansion bus 22 also contains communication logic that serves to enable the Ethernet switch processors on multiple Ethernet frame switches 10 to inter-communicate and exchange information regarding their address tables, as well as to notify each other of the presence of Ethernet frames that must be transferred between devices over the expansion bus 22.

Previously, the implementation of Ethernet MAC-layer protocol has been carried out via a purely hardware-based approach, with all of the functions of the protocol being implemented using hard-wired silicon gates. In the Ethernet frame switch 10 only those parts of the MAC-layer protocol processing in hardware that pertain to frame data handling and bit-timing functions. The remainder of the functions, notably error classification, collision handling and statistics collection, are implemented by means of firmware routines running on the Ethernet switch processor 12. The latter functions are characterized by their relatively low processing rate requirements (i.e., these functions are executed on a frame by frame basis rather than a bit-by-bit basis) and high level of complexity.

A Remote Monitoring (RMON) standard requires the collection of a number of statistics regarding different frame types and sizes received on individual physical ports of the Ethernet frame switch 10, as well as statistics regarding the source and destination end-systems associated with the Ethernet frames. The normal approach towards implementing the RMON standard is to create a large collection of hardware counters, which are updated by means of logic that inspects received and transmitted frames, classifies them, and then determines which counters to increment and by what amount. This logic is clearly quite complex and also requires considerable silicon to implement. As previously discussed the Ethernet frame switch 10 provides only a basic frame length counter which counts the number of octets or bytes present in each received or transmitted frame in hardware. The counters themselves are implemented as software variables maintained within the External memory 30. The task of classifying the frame and determining which counters to increment is implemented via firmware routines running on the Ethernet switch processor 12. When a frame is received or transmitted, the firmware inspects the frame, classifies it into normal or errored frames, and, if errored, the type of error present. The firmware then locates and updates the necessary counters, utilizing the frame length counter to determine the increment amount.

The RMON standard requires that incoming frames be classified according to their length, and separate counters be incremented depending on the particular range of lengths that the frame falls into. To aid in the rapid classification of the frame length relative to the ranges defined in the RMON standard, the Ethernet switch processor 12 implements a special instruction mechanism (in addition to the normal arithmetic, logic, load/store and control transfer instructions required of a normal CPU). This instruction mechanism accepts as input the total length of the frame in bytes, and generates as output a numeric index of the range of sizes into which the frame falls. The implementation of this means of classifying the frame size permits the range classification function of the RMON standard to be implemented with increased speed in firmware.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A network switch comprising:
   (a) a plurality of media access control (MAC) interface logic circuits each coupled to an associated output port operative to perform serial-to-parallel conversion for frames being received from an associated output port and parallel-to-serial conversion for frames being transferred to an associated output port, clock synchronization, preamble generation, stripping and data buffering required to convert between bit-serial data streams exchanged with external transceivers and parallel data streams employed internally by said network switch;
   (b) an internal bus;
   (c) a switch central processor coupled to said internal bus;
   (d) a multi-channel Direct Memory Access (DMA) controller coupled to said internal bus and to said switch central processor, operative to transfer incoming frames to an external memory and to transfer outgoing frames stored temporarily in the external memory to their destination, said outgoing frames being transferred one at a time in accordance with instructions from said switch central processor;
   (e) a memory controller coupled to said DMA controller and to an external memory port operative to interface between said DMA controller and the external memory; wherein said switch central processor has queuing firmware operative to set up transmit and receive queuing functions for frame transfer to and from the frame memory and storage in the frame memory.

2. A network switch according to claim 1, wherein each of said MAC interface logic circuits has hardware for implementing serializer/deserializer conversion, transmit and receive byte counters, transmit and receive state machines, and control logic circuits for controlling reception and transmission of data bytes and detecting collisions and buffering and synchronizing FIFO's and said switch central processor has firmware operative to perform frame error classification and frame-level MAC protocol functions.

3. A network switch according to claim 2, wherein said frame-level MAC protocol functions include carrier deference before transmit, retransmission upon collision, frame discard upon excessive collisions and MAC-level statistics maintenance.

4. A network switch according to claim 1, including a receive byte counter operative to count the number of 8-bit bytes in a received frame and wherein said switch central processor has firmware for reading the contents of said receive byte counter, for classifying frame lengths, and accessing and updating counters stored in the external memory and performing remote monitoring statistics counter updates.

5. A network switch according to claim 4, wherein said switch central processor accepts as input from said receive byte counter the total length of a frame in bytes, and generates as output a numeric index of the range of sizes into which the frame falls.

6. A network switch according to claim 4, wherein said switch central processor in response to firmware routines, inspects a frame when either received or transmitted, classifies a frame as normal or errored and, if errored, the type of error present, and then locates and increments required counters by an amount determined by a value stored in said receive byte counter.

7. A network switch according to claim 1, wherein said switch central processor has hardware to perform bit-by-bit frame handling and firmware to implement frame-by-frame processing.

8. A network switch according to claim 7, wherein said frame-by-frame processing includes queuing of received frames, queuing of transmit frames, frame buffer deallocation, and MAC protocol functions.

9. A network switch according to claim 8, wherein said MAC protocol functions include carrier deference before transmit, retransmission upon collision, frame discard upon excessive collisions and MAC-level statistics maintenance.

10. A network switch according to claim 1, wherein the external memory is external to said network switch.

11. A network switch according to claim 1, including a buffer memory coupled to each of said MAC interface logic circuits at one end and to said internal bus at another end.

12. A network switch according to claim 1, wherein said switch central processor has firmware operative to perform frame address handling and to control transfer of incoming frames to their destination and including an expansion bus interface logic circuit coupled to said DMA controller and to an expansion bus port, operative to interface to another network switch and wherein frame transfers between MAC interface logic circuits in said network switch and between one of said plurality of MAC interface logic circuits on said network switch and a MAC interface logic circuit on another network switch are independent of frame transfers between others of said plurality of MAC interface logic circuits.

13. A network switch according to claim 12, wherein said switch central processor has firmware operative to perform frame address handling and to control transfer of incoming frames to their destination and including an expansion bus interface logic circuit containing a combination of distributed communication logic and firmware that enables switch central processors of interconnected ones of said network switches to inter-communicate.

14. A network switch according to claim 1, wherein said switch central processor has firmware operative to perform frame address handling and to control transfer of incoming frames to their destinations.

15. A network switch according to claim 1, wherein said switch central processor has firmware operative to implement statistics gathering.

16. A network switch according to claim 1, wherein said switch central processor has firmware operative to implement buffer deallocation.

17. A network switch according to claim 1, wherein said switch central processor has firmware operative to implement error processing.

18. A network switch according to claim 1, wherein said switch central processor has firmware operative to implement MAC protocol functions.

19. A network switch according to claim 1, wherein said expansion bus interface logic circuit has firmware to implement a distributed control that initiates and controls a transfer of frames over said expansion bus interface to other network switches.

20. A network switch, comprising:
   (a) a plurality of media access control (MAC) interface logic circuits each coupled to an associated output port operative to perform serializer/deserializer conversion and to transfer incoming frames to an external memory, and to transfer outgoing frames from the external memory to their destination, said frames being transferred one at a time;
   (b) an internal bus;
   (c) a buffer memory coupled to each of said MAC interface logic circuits at one end and to said internal bus at another end;
   (d) a switch central processor coupled to said internal bus, said switch central processor having firmware operative to perform frame address handling and control transfer of incoming frames to their destinations, to implement statistics counter maintenance for remote monitoring, collision back-off time computation, frame enqueuing and dequeuing, buffer deallocation, error processing and MAC protocol functions;
   (e) a multi-channel Direct Memory Access (DMA) controller coupled to said internal bus and to said switch central processor, operative to transfer incoming frames to the external frame memory and to transfer outgoing frames stored temporarily in the external frame memory to their destination, said outgoing frames being transferred one at a time in accordance with instructions from said switch central processor;
   (f) an external frame memory controller coupled to an external frame memory port;
   wherein said switch central processor has queuing firmware operative to set up transmit and receive queuing functions for frame transfer to and from said frame memory and storage in said frame memory.

21. A network switch according to claim 20, further comprising an expansion bus port and an expansion bus interface logic circuit coupled to said DMA Controller and to said expansion bus port, said expansion bus interface logic circuit having firmware operative to initiate and control a transfer of frames to other network switches.

22. A network switch according to claim 20, wherein said DMA controller computes a Frame Check Sequence result over each incoming frame and forwards the result to said switch central processor for use in frame error classification.

23. A plurality of network switches, each of said plurality of network switches comprising:
   (a) a plurality of media access control (MAC) interface logic circuits each coupled to an associated output port operative to perform clock synchronization, preamble generation, and stripping and data buffering required to convert between bit-serial data streams exchanged with external transceivers and parallel data streams employed internally by said network switch;
   (b) an internal bus;
   (c) a switch central processor coupled to said internal bus;
   (d) a multi-channel Direct Memory Access (DMA) controller coupled to said internal bus and to said switch central processor, operative to transfer incoming frames to an external memory and to transfer outgoing frames stored temporarily in the external memory to their destination, said outgoing frames being transferred one at a time in accordance with instructions from said switch central processor;
   (e) a memory controller coupled to said DMA controller and to an external memory port operative to interface between said DMA controller and the external memory; and
   (f) an expansion bus interface logic circuit coupled to said DMA Controller and to an expansion bus port;
   wherein said switch central processor performs frame address handling and controls transfer of incoming frames to their destination, and wherein said switch central processor has queuing firmware operative to set up transmit and receive queuing functions for frame transfer to and from the frame memory and storage in the frame memory and expansion bus coupled to said expansion bus interface logic circuit of each of said plurality of network switches.

* * * * *

UNITED STATES PATENT AND TRADEMARK OFFICE
CERTIFICATE OF CORRECTION

PATENT NO.    : 5,909,564
DATED         : June 1, 1999
INVENTOR(S)   : Thomas Alexander et al.

It is certified that error appears in the above-identified patent and that said Letters Patent is hereby corrected as shown below:

Column 1,
Line 28, after "provide" delete "a";
Line 55, replace "An" with -- A --;
Line 66, replace "many" with -- may --;

Column 2,
Line 2, after "and" insert -- said --;

Column 3,
Line 11, replace "26" with -- 16 --;
Line 38, after the "." replace "the" with -- The --;
Line 50, replace "460" with -- 40 --;

Column 4,
Line 47, after "30" insert -- . --;

Column 5,
Line 7, replace "compete" with -- complete --;

Column 9,
Line 21, after "performs" replace "and" with -- an --;
Line 54, replace "222" with -- 122 --;

Column 10,
Line 33, replace "are" with -- is --;
Line 39, after "be" delete "may be";

Column 12,
Line 33, replace "4" with -- 3 --; and

UNITED STATES PATENT AND TRADEMARK OFFICE
CERTIFICATE OF CORRECTION

PATENT NO. : 5,909,564
DATED : June 1, 1999
INVENTOR(S) : Thomas Alexander et al.

It is certified that error appears in the above-identified patent and that said Letters Patent is hereby corrected as shown below:

Column 13,
Line 7, replace "12" with -- 1 --.

Signed and Sealed this

Twelfth Day of April, 2005

JON W. DUDAS
*Director of the United States Patent and Trademark Office*